C. C. COX AND G. W. LENTZ.
STORAGE BATTERY INDICATING DEVICE.
APPLICATION FILED MAR. 11, 1918.
1,373,951.
Patented Apr. 5, 1921.
2 SHEETS—SHEET 1.
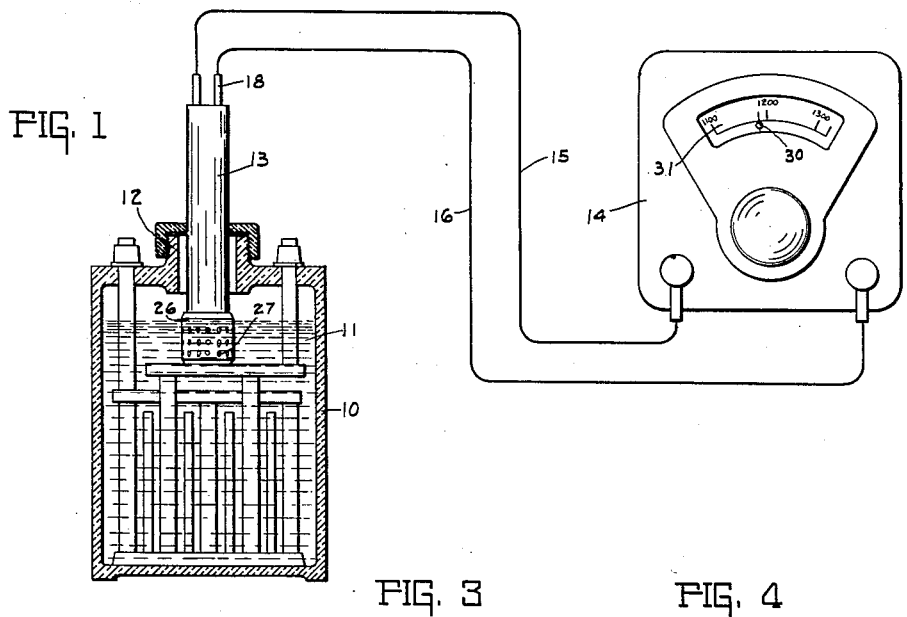
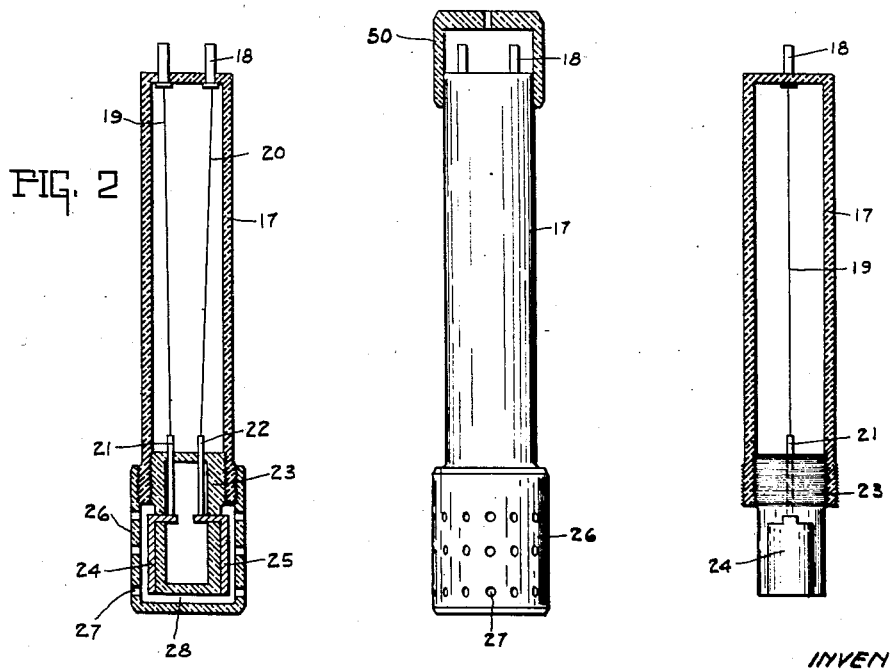
INVENTOR
CLARE C. COX, AND
GEORGE W. LENTZ.
BY
Lockwood & Lockwood
ATTORNEYS.

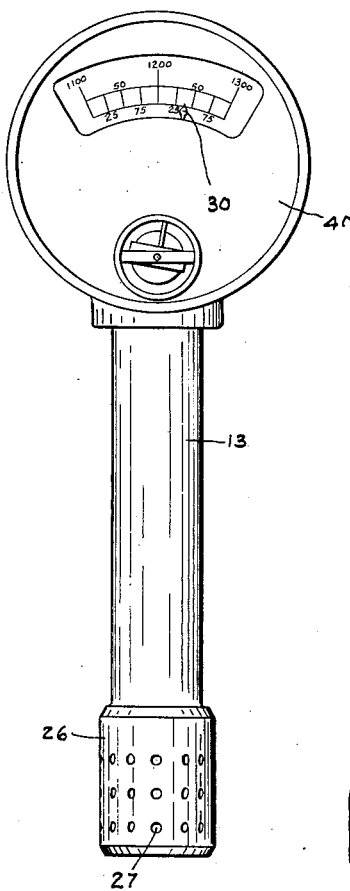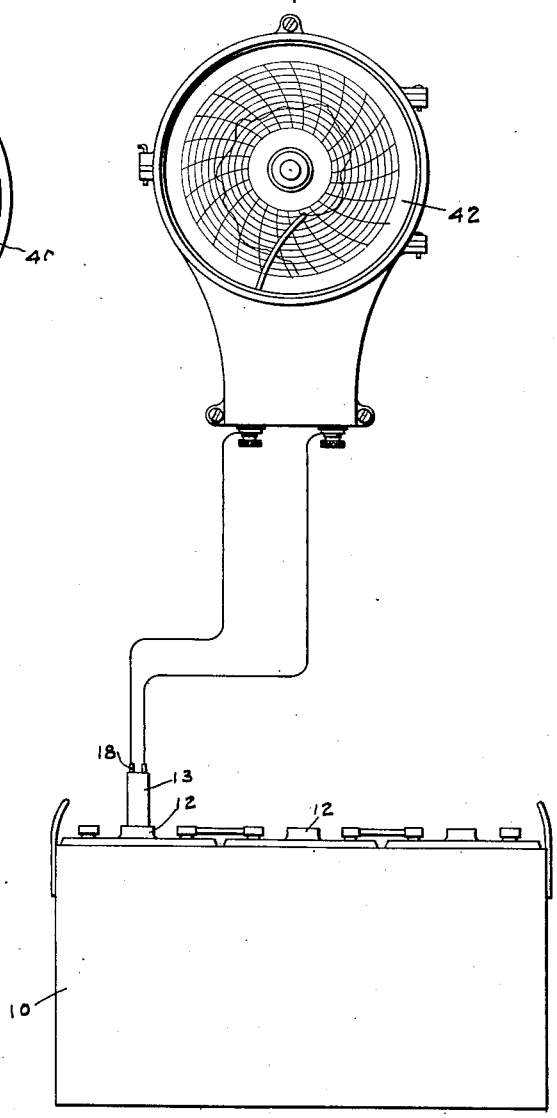

UNITED STATES PATENT OFFICE.

CLARE C. COX AND GEORGE W. LENTZ, OF INDIANAPOLIS, INDIANA; SAID COX ASSIGNOR OF ONE-TENTH OF THE WHOLE RIGHT TO SAID LENTZ.

STORAGE-BATTERY INDICATING DEVICE.

1,373,951.  Specification of Letters Patent.  Patented Apr. 5, 1921.

Application filed March 11, 1918. Serial No. 221,741.

*To all whom it may concern:*

Be it known that we, CLARE C. COX and GEORGE W. LENTZ, citizens of the United States, and residents of Indianapolis, county of Marion, and State of Indiana, have invented a certain new and useful Storage-Battery Indicating Device; and we do hereby declare that the following is a full, clear, and exact description thereof, reference being had to the accompanying drawings, in which like numerals refer to like parts.

The object of this invention is to determine and indicate electrically the specific gravity of a storage battery, or the electrolyte therein. This has heretofore been usually determined by inserting a float hydrometer in the upper part of the battery. This, however, is not satisfactory because it requires considerable trouble to open the battery and insert the hydrometer and remove it and read the hydrometer.

With our invention the specific gravity determining means may be permanently mounted in connection with the battery and suitable electrically operated indicating and recording means be connected therewith, so that by merely looking at the indicator at any time, one will know the specific gravity or condition of the battery at that time.

With such a device, anybody however unskilled will be enabled to know the battery condition, whereas with the hydrometer, it is generally necessary for the owner of an automobile to take it to some battery service station for learning the condition of his battery.

The chief feature of the invention consists in using or associating with a suitable indicating device electrically influenced means insertible in the electrolyte of a storage battery for producing current and thereby determining the specific gravity of the battery or electrolyte therein. Another feature of the invention consists of the particular construction of such electric current generator, including a tube made of non-corrosive material and acid proof, adapted to be inserted in the battery so that the lower end of the tube will extend into the upper portion of the electrolyte and provided in the lower end of said tube is a pair of non-corrosive terminals or plates made of different kinds of metal, so that they will act in the nature of a miniature battery and generate a current, which passes out of this device through suitable electrical connections to an indicating means provided with a suitable scale for indicating the specific gravity of the electrolyte.

With this arrangement we are not only enabled to have a permanent means for measuring and indicating the specific gravity, but it may be used for measuring the specific gravity of freshly mixed electrolyte before its application to the storage battery. And the instrument may be inserted in the cell of a storage battery which is being charged, in order to indicate the rise in specific gravity during the process of charging the battery. This may be done in a railway power house, using auxiliary storage battery power, or on the dash board of an automobile, or in an aeroplane, automobile truck, motor boat, or railway car which uses a self charging battery train lighting system. It is also for use in connection with steam ships and steam boats and with wireless telegraph and telephone systems, which use storage batteries, and also for army and navy radio stations, or submarine boats, or street or interurban cars or any other structure or place where storage batteries are used.

Another purpose of this invention is that it will enable one to learn or determine the condition of the storage battery although he is quite a distance away from the battery, as the electrolyte current generator in the battery may be connected by wires or cables to the indicating or recording means located at any desired distance away from the battery.

The invention may be used as a stationary or solidly mounted device on the wall of a switch board, or it may be constructed as a portable instrument to carry from point to point for the purpose of making tests at any place desired. The electrolyte current generator may be directly connected with the indicating instrument, or remotely connected.

The full nature of the invention will be understood from the accompanying drawings and the following description and claims.

In the drawings Figure 1 is a central vertical section of a storage battery equipped with an electrolyte current generator and an indicating means shown in elevation. Fig. 2 is a central vertical section through the electrolyte current generator. Fig. 3 is an elevation with the cap thereon in section. Fig. 4 is a section at a right angle to that shown in Fig. 2, omitting the cap at the lower end. Fig. 5 is a modified form in elevation showing a portable measuring and indicating device. Fig. 6 is another modified form showing the battery in side elevation, and an electrical recorder in front elevation and lines connecting them.

In the drawings there is shown a storage battery 10, and in Fig. 1 the electrolyte 11 is shown as surrounding the usual form of battery plates. The upper end of the battery has a vent cap 12 through which the electrolyte current generator 13 is inserted, so that the lower end will extend inwardly in the upper portion of the electrolyte. There is shown an electrical indicator 14 calibrated for specific gravity and it is connected by the lines 15 and 16 with the device 13.

The construction of the electrolyte current generator will be understood from Figs. 2, 3, and 4. There is a tube 17 of hard rubber with its upper end closed and having in it two connections 18 for connecting the wires 15 and 16, which are outside of the electrolyte current generator, with the wires 19 and 20 within the device.

These wires 19 and 20 extend down to metallic connectors 21 and 22, which are mounted in a hollow member or tube 23 that screws into the tube 17. These members 17 and 23 are made of hard rubber and so that the chambers within them will be acid proof.

Non-corrosive metallic plates or terminals 24 and 25 are mounted in connection with the hollow member 23 and below the tubes 17. Said plates are inverted L-shaped with the main portion lying outside and against the outer surface of the member 23 and the upper ends extending through said member 23 and within the chamber of the member 23 and are connected with the connectors 21 and 22 so as to establish an electrical circuit through the plates 24 and 25 to the indicator 14. The lower portion of the device just described shown in Fig. 4 is inclosed by a cap 26 made of hard rubber and having perforations 27 through which the electrolyte enters the chamber 28 lying between the cap and the plates, as appears in Fig. 2.

The purpose of the terminals or plates 24 and 25 is to coöperate with the electrolyte and generate current and therefore said terminal plates must be of dissimilar metal, so far as the chemical action thereon of the electrolyte is concerned. The metal must not be soluble in sulfuric acid. The plates may be made of gold and platinum respectively, but for some purposes there may be used gold and nickel, or copper and nickel and other different metals having the characteristics specified.

The electrolytic current generator is substantially like a miniature battery, with its strength depending upon the strength of the acid, and the current is transmitted to the indicator.

The indicating instrument 14 should be so constructed as to be a polarity indicating device, and it may be stated that the polarity of the current flowing from the electrolytic current generator and the actuating coil in the indicating device is determined by the predominance of one or more plates in the area of surface over the opposite plate or plates, the larger surface being the plus side of the circuit. The indicating needle 30, when connected according to the usual practice in electrical indicating instruments which are polarity indicators, moves over the scale 31, which has in the form shown, numerals from 1100 to 1300, as specific gravity of batteries ranges usually from 1.100 and 1.350.

The form shown in Fig. 5 is easily portable and insertible in storage batteries temporarily, as for instance while the same are being charged to determine the specific gravity of the electrolyte. In this form the indicator 40 is rigidly secured to the upper end of the electrolytic current generator 13. The details of the electrical connection between these members is the same in principle as that shown in Fig. 1 but said details are not herein illustrated.

The modified form shown in Fig. 6 presents a recorder indicating device 42. It is immaterial what kind of indicator device is employed, as that is a matter of choice, and the construction of the indicating mechanism in itself is not our invention.

To protect the connection 18 at the upper end of the measuring device, while the same is being handled or carried, a removable cap 50 is placed thereon as shown in Fig. 3.

The invention is not limited to the particular form of construction or materials suggested, as the same may be modified and yet keep within the principle of the invention as herein set forth.

The invention claimed is:—

1. In means for measuring the specific gravity of the electrolyte in storage batteries, a current generating device adapted to be inserted in the electrolyte, including a body portion, oppositely located terminal plates secured to the lower end thereof and made of dissimilar metal, and protected conductor means leading from said plates.

2. In means for measuring the specific gravity of the electrolyte in storage batteries, a current generating device adapted to be inserted in the electrolyte including an acid proof tubular construction, terminal plates made of dissimilar metal on the outside of the lower part of said tubular construction and with extensions inside the same, and electrical connections from the inward extension of each of said plates leading out of said tubular construction.

3. In means for measuring the specific gravity of the electrolyte in storage batteries, a current generating device adapted to be inserted in the electrolyte, including a tubular construction made of rubber and with its lower end closed so that it will be fluid tight, a pair of oppositely located terminal plates made of dissimilar metal secured to the lower portion of said construction and outside the same and having extensions inward, and an electrical conductor leading from the inward extension of each plate up through and out of said tubular construction.

4. In means for measuring the specific gravity of the electrolyte in storage batteries, a current generating device adapted to be inserted in the electrolyte and including a main hard rubber tube with its lower end open and threaded, another rubber tube in threaded connection with the main rubber tube and with its lower end closed, a pair of oppositely located terminal plates made of dissimilar metal and secured to the outside of said second tube with extensions inward from said plates, and an electrical connection leading from the extension of each plate up through said tubes.

5. In means for measuring the specific gravity of the electrolyte in storage batteries, a current generating device adapted to be inserted in the electrolyte, including a main rubber tube closed at its upper end and open and threaded at its lower end, a second rubber tube adapted to screw in connection with the lower end of the main tube and being closed at its lower end, a pair of oppositely located terminal plates made of dissimilar metal and secured to the outside of the second tube with inward extensions therefrom, a metal connection with each of said extensions extending up from the second tube, and wires connected with said metal connections.

6. In means for measuring the specific gravity of the electrolyte in storage batteries, a current generating device adapted to be inserted in the electrolyte, including a main hard rubber tube with its lower end open and threaded, another rubber tube in threaded connection with the main rubber tube and with its lower end closed, a pair of oppositely located terminal plates made of dissimilar metal and secured to the outside of said second tube with extensions inward from said plates, an electrical connection leading from the extension of each plate up through said tubes, and a perforated rubber cap secured to the lower end of the main tube and surrounding the second tube and the metal plates thereon.

In witness whereof, we have hereunto affixed our signatures.

CLARE C. COX.
GEORGE W. LENTZ.